(12) United States Patent
Tsutsumi

(10) Patent No.: US 9,534,797 B2
(45) Date of Patent: Jan. 3, 2017

(54) AIR-CONDITIONING APPARATUS

(75) Inventor: Hiroshi Tsutsumi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 590 days.

(21) Appl. No.: 13/265,340

(22) PCT Filed: May 13, 2009

(86) PCT No.: PCT/JP2009/058886
§ 371 (c)(1),
(2), (4) Date: Oct. 20, 2011

(87) PCT Pub. No.: WO2010/131336
PCT Pub. Date: Nov. 18, 2010

(65) Prior Publication Data
US 2012/0037714 A1 Feb. 16, 2012

(51) Int. Cl.
*F24F 7/00* (2006.01)
*F24F 3/044* (2006.01)
(Continued)

(52) U.S. Cl.
CPC .......... *F24F 3/0442* (2013.01); *F24F 11/0079* (2013.01); *F24F 11/04* (2013.01); *Y02B 30/746* (2013.01); *Y02B 30/767* (2013.01)

(58) Field of Classification Search
CPC ...... F24F 3/0442; F24F 11/0079; F24F 11/04; Y02B 30/746; Y02B 30/767
(Continued)

(56) References Cited

U.S. PATENT DOCUMENTS 3,818,814 A * 6/1974 Obler .................. F24F 3/044
236/49.3
4,698,981 A * 10/1987 Kaneko et al. .............. 62/180
(Continued)

FOREIGN PATENT DOCUMENTS

CN 101303153 A 11/2008
JP 3-51658 A 3/1991
(Continued)

OTHER PUBLICATIONS

Chinese Office Action dated Jul. 22, 2013, issued by the Chinese Patent Office in corresponding Chinese Patent Application No. 200980159213.6, and English language translation of Office Action. (10 pages).
(Continued)

*Primary Examiner* — Allana Lewin Bidder
*Assistant Examiner* — Kun Kai Ma
(74) *Attorney, Agent, or Firm* — Buchanan Ingersoll & Rooney PC

(57) ABSTRACT

Provided is an easy-to-design, inexpensive air-conditioning apparatus in which an external static pressure and an airflow are calculated without using a static-pressure detector and an indoor-unit-side fan is controlled using those values. An air-conditioning apparatus according to the present invention is configured such that a control unit (indoor-unit-side control unit) stores an external static pressure of an indoor unit calculated from a rotation speed of an indoor-unit-side fan when the airflow of the indoor-unit-side fan is controlled to a predetermined rated airflow and controls the rotation of the indoor-unit-side fan so that the external static pressure of the indoor unit obtained thereafter from the rotation speed of the indoor-unit-side fan approaches the stored external static pressure.

9 Claims, 15 Drawing Sheets

(51) Int. Cl.
*F24F 11/00* (2006.01)
*F24F 11/04* (2006.01)

(58) Field of Classification Search
USPC ............................... 62/180, 186, 228.1, 229
See application file for complete search history.

(56) References Cited

U.S. PATENT DOCUMENTS

| | | | | |
|---|---|---|---|---|
| 5,076,346 | A * | 12/1991 | Otsuka | F24F 3/044 165/217 |
| 5,439,415 | A * | 8/1995 | Hirikawa | B61D 27/0009 454/105 |
| 5,692,385 | A * | 12/1997 | Hollenbeck et al. | 62/154 |
| 5,761,918 | A * | 6/1998 | Jackson et al. | 62/181 |
| 5,772,501 | A * | 6/1998 | Merry | F24F 3/044 236/49.3 |
| 6,994,620 | B2 | 2/2006 | Mills | |
| 2001/0000407 | A1* | 4/2001 | Ichishi et al. | 236/13 |
| 2004/0219875 | A1* | 11/2004 | Mills | 454/256 |
| 2006/0088424 | A1* | 4/2006 | Lee | 417/53 |
| 2006/0116067 | A1* | 6/2006 | Federspiel | F24F 11/0001 454/256 |
| 2006/0260334 | A1* | 11/2006 | Carey et al. | 62/176.6 |
| 2007/0204635 | A1* | 9/2007 | Tanaka et al. | 62/129 |
| 2008/0139105 | A1* | 6/2008 | Kuentz | F24F 11/0079 454/238 |

FOREIGN PATENT DOCUMENTS

| | | | |
|---|---|---|---|
| JP | 3-84352 A | | 4/1991 |
| JP | 04126949 A | * | 4/1992 |
| JP | 06323582 A | * | 11/1994 |
| JP | 8-159532 A | | 6/1996 |
| JP | 8-219535 A | | 8/1996 |
| JP | 2005147490 A | * | 6/2005 |

OTHER PUBLICATIONS

International Search Report (PCT/ISA/210) issued on Jul. 28, 2009, by Japanese Patent Office as the International Searching Authority for International Application No. PCT/JP2009/058886.

Japanese Office Action (Notice of Reasons for Rejection) dated Mar. 26, 2013, issued in corresponding Japanese Patent Application No. 2011-513154, and English language translation of Office Action. (4 pages).

Apr. 1, 2014 Chinese Office Action issued in Chinese Patent Application No. 200980159213.6.

Jun. 27, 2014 Chinese Office Action issued in Chinese Patent Application No. 200980159213.6. (with English language translation).

* cited by examiner

FIG. 7

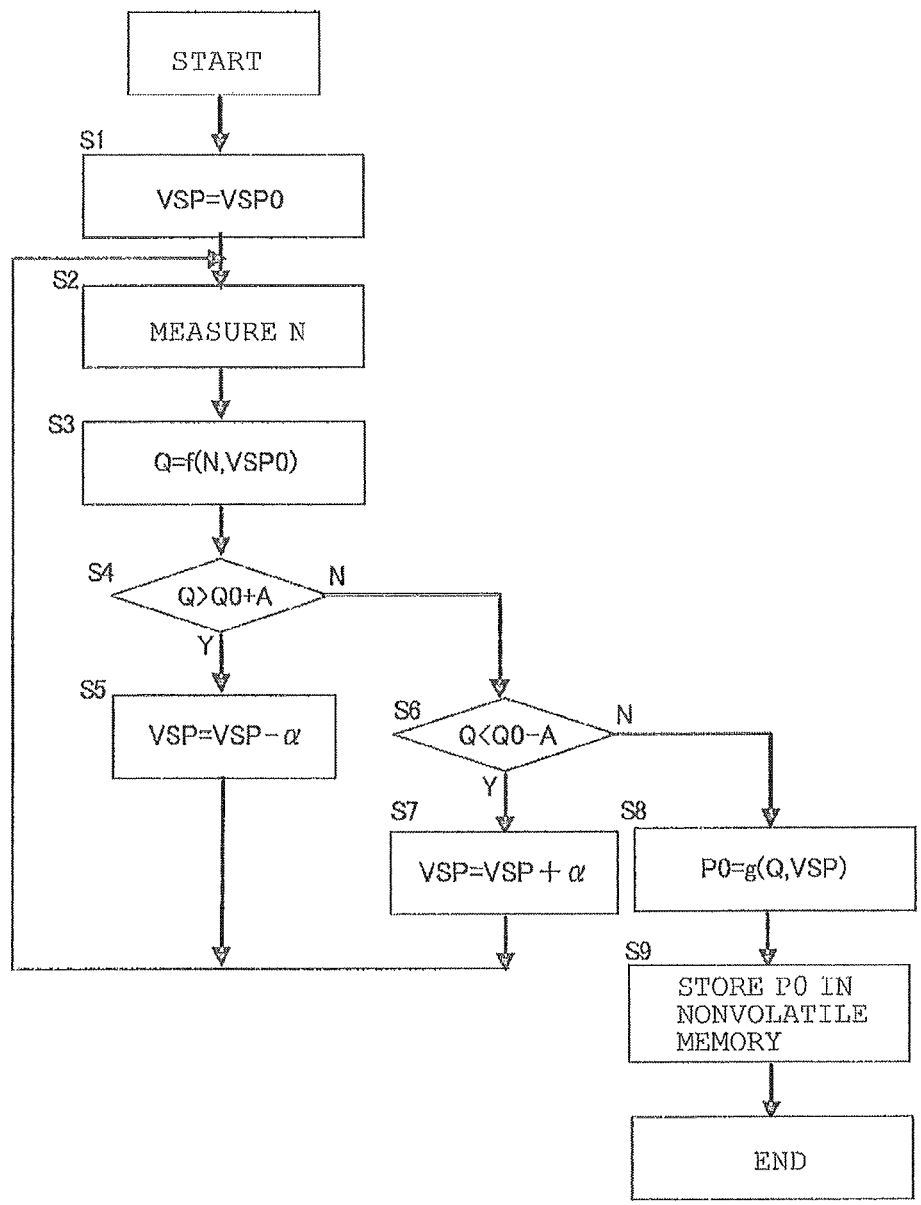

VSP: SPEED INSTRUCTION VOLTAGE
VSP0: SPEED INSTRUCTION VOLTAGE REFERENCE VALUE
N: ROTATION SPEED OF FAN
Q: AIRFLOW
f (N, VSP0): FUNCTION FOR CALCULATING AIRFLOW FROM
　　　　　　ROTATION SPEED AND SPEED INSTRUCTION VOLTAGE
Q0: REFERENCE AIRFLOW
A: AIRFLOW STABLING TOLERANCE
α: VARIATION RANGE OF VSP
P0: INITIAL VALUE OF EXTERNAL STATIC PRESSURE
g (Q, VSP): FUNCTION FOR CALCULATING EXTERNAL STATIC PRESSURE
　　　　　　FROM AIRFLOW AND SPEED INSTRUCTION VOLTAGE

FIG. 8

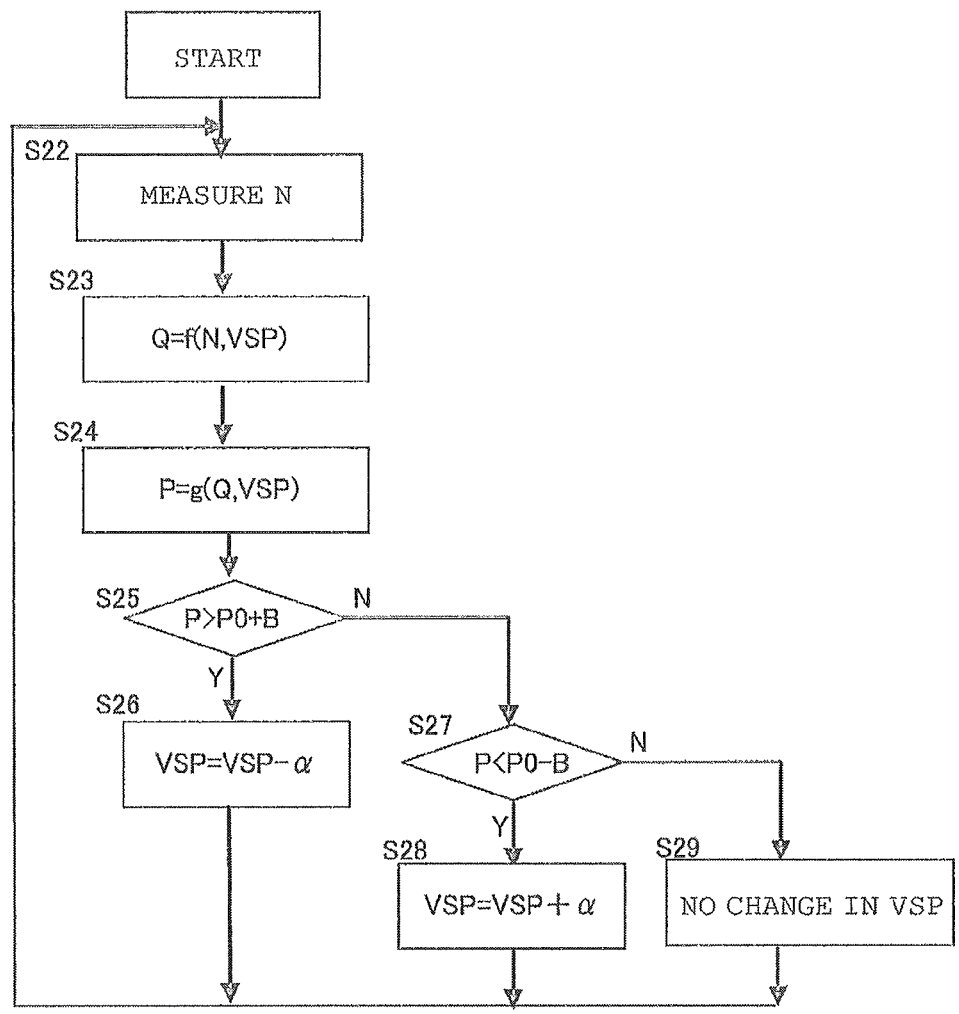

VSP: INSTRUCTION VOLTAGE
VSP0: SPEED INSTRUCTION VOLTAGE REFERENCE VALUE
N: ROTATION SPEED
Q: AIRFLOW
f (N, VSP0): FUNCTION FOR CALCULATING AIRFLOW FROM
            ROTATION SPEED AND INSTRUCTION VOLTAGE
P: EXTERNAL STATIC PRESSURE
P0: INITIAL VALUE OF EXTERNAL STATIC PRESSURE
g (Q, VSP): FUNCTION FOR CALCULATING EXTERNAL STATIC
            PRESSURE FROM AIRFLOW AND INSTRUCTION VOLTAGE
B: EXTERNAL STATIC PRESSURE STABLING TOLERANCE
α: VARIATION RANGE OF VSP

F I G. 9
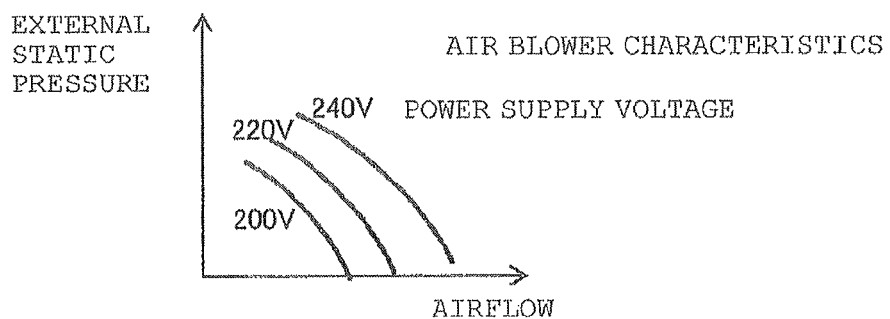
F I G. 1 0
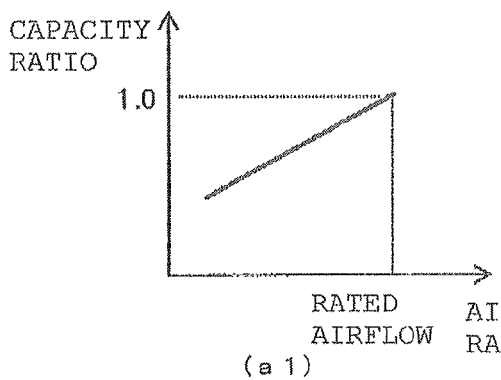
(a 1)
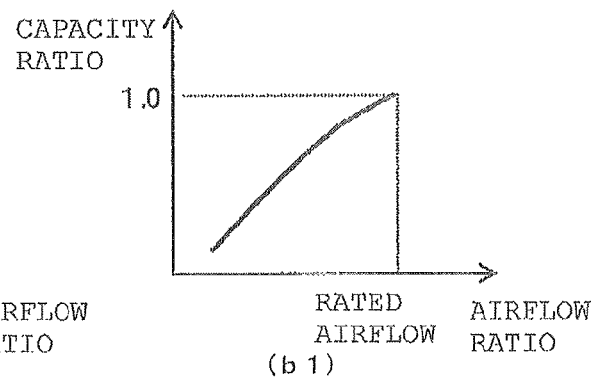
(b 1)
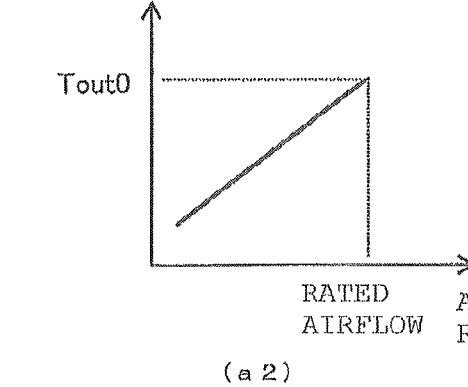
(a 2)
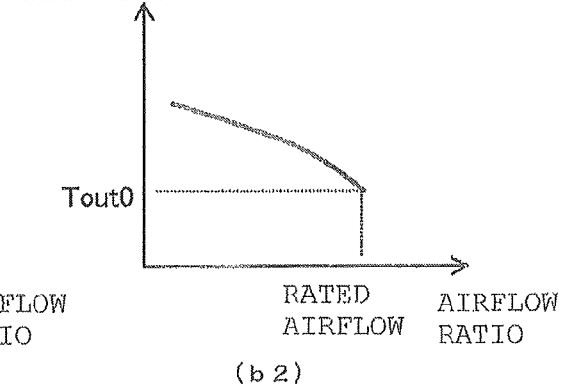
(b 2)

Tout: BLOWN-OUT-AIR TEMPERATURE SENSOR DETECTION TEMPERATURE
Tout0: REFERENCE TEMPERATURE OF BLOWN-OUT AIR
Q: TOLERANCE
F: COMPRESSOR FREQUENCY
Fmax: MAXIMUM VALUE OF COMPRESSOR FREQUENCY
Fmin: MINIMUM VALUE OF COMPRESSOR FREQUENCY
β: COMPRESSOR FREQUENCY VARIATION RANGE F I G. 1 4
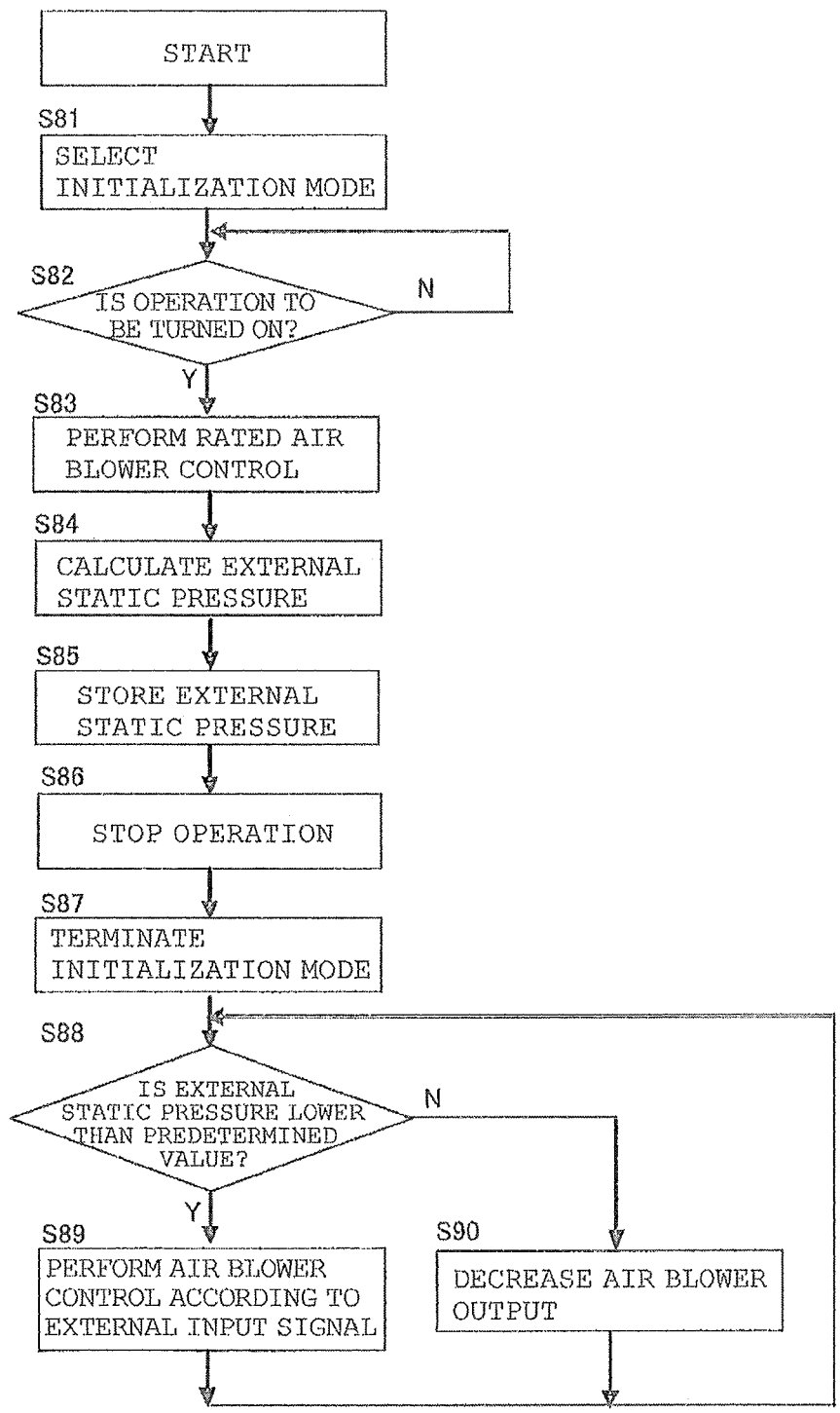

F I G. 1 8
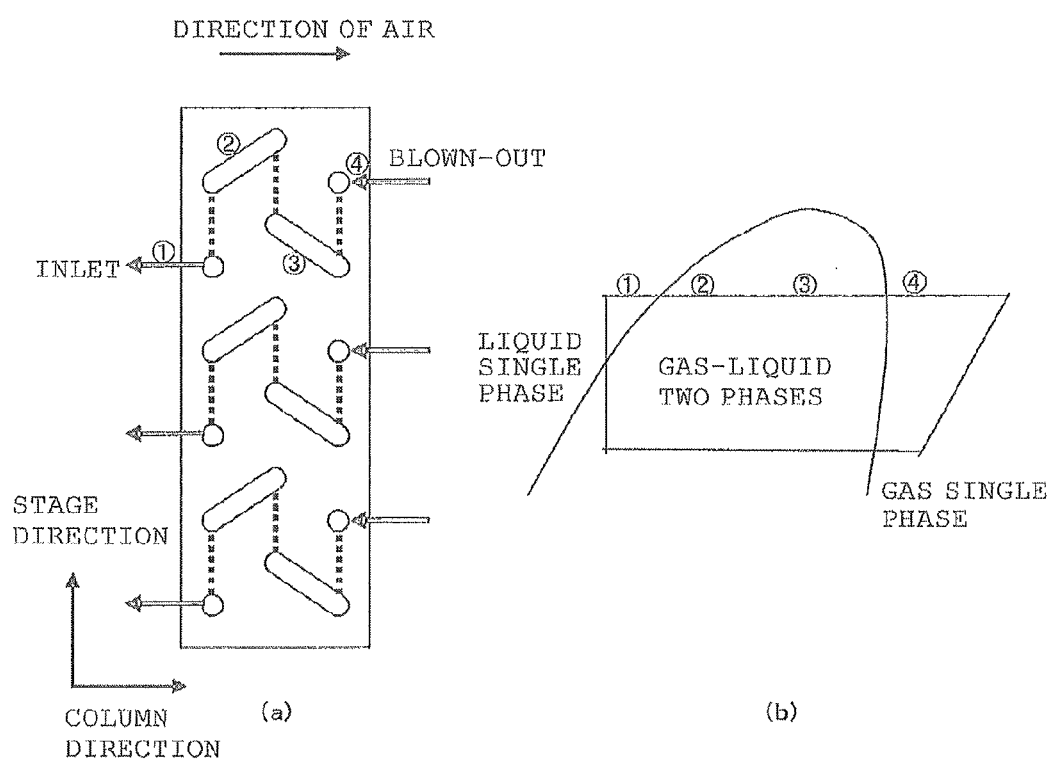

Tp: REFRIGERANT PIPE-TEMPERATURE SENSOR DETECTION TEMPERATURE
Tp0: REFERENCE TEMPERATURE OF REFRIGERANT PIPE
C: TOLERANCE
F: COMPRESSOR FREQUENCY
Fmax: MAXIMUM VALUE OF COMPRESSOR FREQUENCY
Fmin: MINIMUM VALUE OF COMPRESSOR FREQUENCY
β: COMPRESSOR FREQUENCY VARIATION RANGE

AIR-CONDITIONING APPARATUS

TECHNICAL FIELD

The present invention relates to an air-conditioning apparatus that controls an external static pressure and an airflow, and controls the capacity of a compressor on the basis of a blown-out air temperature.

BACKGROUND ART

Many conventional air-conditioning apparatuses that execute multi-room air conditioning have a plurality of air blowout ports that branch through ducts and static-pressure detectors provided in the blowout-side ducts and control fans on the basis of external static pressures detected by the static-pressure detectors. Such air-conditioning apparatuses have dampers in the vicinity of the air blowout ports, control the airflows with the dampers, and execute fan control on the basis of control values thereof.

For example, "a VAV air-conditioning system comprising a fan capable of automatic airflow control, an air blowing system communicating with the fan, a plurality of dampers installed in the air blowing system and capable of separately automatically controlling the individual opening-degrees, and a static-pressure detector installed in said air blowing system, wherein said fan is configured to be follow-up controlled so that a detected static pressure value detected by said static-pressure detector is held at a predetermined static-pressure set value" has been proposed (for example, see Patent Literature 1).

CITATION LIST

Patent Literature

PTL 1: Japanese Unexamined Patent Application Publication No. 8-219535 (FIG. 1)

SUMMARY OF INVENTION

Technical Problem

The conventional air-conditioning apparatuses, as described in Patent Literature 1, cannot execute various kinds of control, such as fan control and performance control, independently. As a result, this requires interconnected control of damper control for each air blowout port, control of the static-pressure detector installed in the duct, and control of the air-conditioning apparatus. In other words, this requires designing the entire system of the air-conditioning apparatus, and thus there is a tendency of the design becoming complex, thus increasing the cost along therewith.

The present invention has been made to solve the problems described above, and an object thereof is to provide an easy-to-design, inexpensive air-conditioning apparatus by calculating an external static pressure and an airflow without using a static-pressure detector and by controlling an indoor-unit-side fan on the basis of these values.

Solution to Problem

An air-conditioning apparatus according to the present invention comprises at least a heat-source-side unit equipped with a compressor, a heat-source-side heat exchanger, and a throttle device; a use-side thermal unit equipped with a use-side fan and a use-side heat exchanger; and a control unit that controls the rotation of said use-side fan, wherein said control unit controls the rotation of said use-side fan on the basis of an external static pressure of said use-side unit obtained from a rotation speed of said use-side fan and an external static pressure of the use-side unit previously stored under the control with a rated airflow.

Advantageous Effects of Invention

With the air-conditioning apparatus according to the present invention, the external static pressure of the indoor unit can be obtained without mounting a static-pressure detector for detecting the external static pressure of the indoor unit. Thus, an easy-to-design, inexpensive air-conditioning apparatus can be provided by controlling the indoor-unit-side fan using the obtained external static pressure.

BRIEF DESCRIPTION OF DRAWINGS

FIG. 7 is a flowchart showing the flow of the process from S03 to S05 in FIG. 6 in detail.

FIG. 8 is a flowchart showing the flow of the process of S08 in FIG. 6 in detail.

FIG. 9 is a fan characteristic diagram showing the relationship between the external static pressure and the airflow.

FIG. 10 is an explanatory diagram for explaining the relationship between the airflow and the performance of the indoor-unit-side fan.

FIG. 14 is a flowchart showing an example of the flow of the process of controlling the rotation speed of the indoor-unit-side fan.

FIG. 18 is an explanatory diagram for explaining the path channels of the indoor-unit-side heat exchanger and the state of the refrigerant at individual portions thereof during heating operation.

DESCRIPTION OF EMBODIMENTS

Embodiments of the present invention will be described hereinbelow.

Embodiment 1

Figure 1:
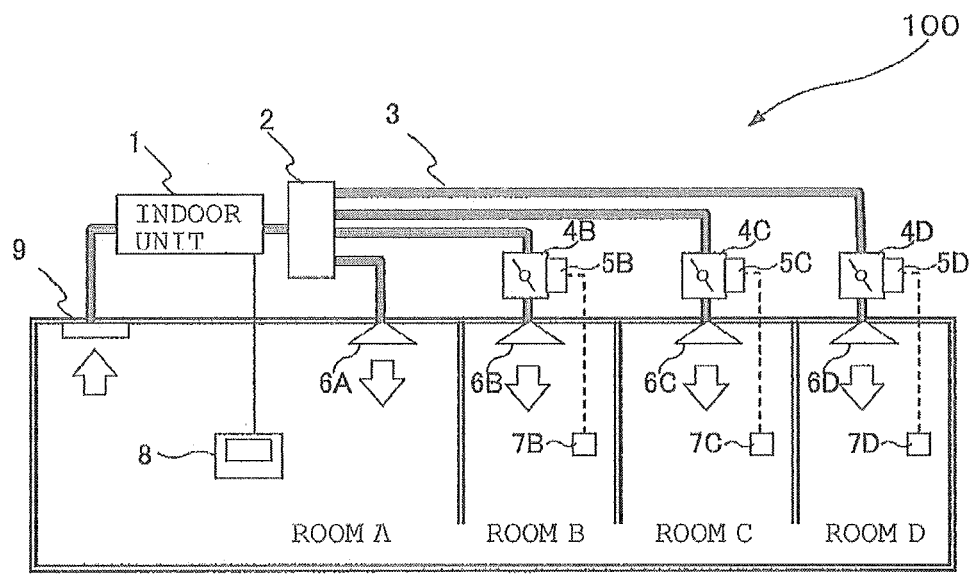
FIG. 1 is a schematic diagram showing an example of the system configuration of an air-conditioning apparatus according to Embodiment 1.

FIG. 1 is a schematic diagram showing an example of the system configuration of an air-conditioning apparatus 100 according to Embodiment 1 of the present invention. The system configuration (an example of installation in an architectural structure) of the air-conditioning apparatus 100 will be described on the basis of FIG. 1. The air-conditioning apparatus 100 is installed in an architectural structure such as a building and an apartment, and executes air conditioning (cooling operation or heating operation) of air-conditioning target areas (for example, four rooms, that is, room A, room B, room C, and room D in FIG. 1) using a refrigerating cycle that circulates a refrigerant. In the following diagrams including FIG. 1, the dimensional relationship among the components sometimes differ from the actual ones.

As shown in FIG. 1, the air-conditioning apparatus 100 includes an indoor unit 1, a branch duct 2 connected to the indoor unit 1, ducts 3 that connect the branch duct 2 and the individual air-conditioning target areas, dampers 4 provided in intermediate portions of the ducts 3, damper controllers 5 that control the dampers 4, air blowout ports 6 each provided at one end of a corresponding duct 3 (end nearer to the air-conditioning target area), for blowing air-conditioned air into the air-conditioning target areas, damper remote controllers 7 serving as operating portions that receive various instructions from the user, such as an airflow request instruction and an operation switch instruction, an indoor-unit remote controller 8 serving as an operating portion that receives instructions from a user, such as an airflow request instruction and an operation switch instruction, and an intake port 9 for taking air into the indoor unit 1.

Furthermore, the air-conditioning apparatus 100 allows air conditioning of the plurality of air-conditioning target areas (room A, room B, room C, and room D) to be executed. Thus, FIG. 1 shows the dampers 4 as a damper 4B to a damper 4D, the damper controllers 5 as a damper controller 5B to a damper controller 5D, the air blowout ports 6 as an air blowout port 6A to an air blowout port 6D, and the damper remote controllers 7 as a damper remote controller 7B to a damper remote controller 7D in correspondence with the respective air-conditioning target areas. The room A is placed as a main air-conditioning space, such as a living room, and is assumed to be always air-conditioned.

Figure 2:
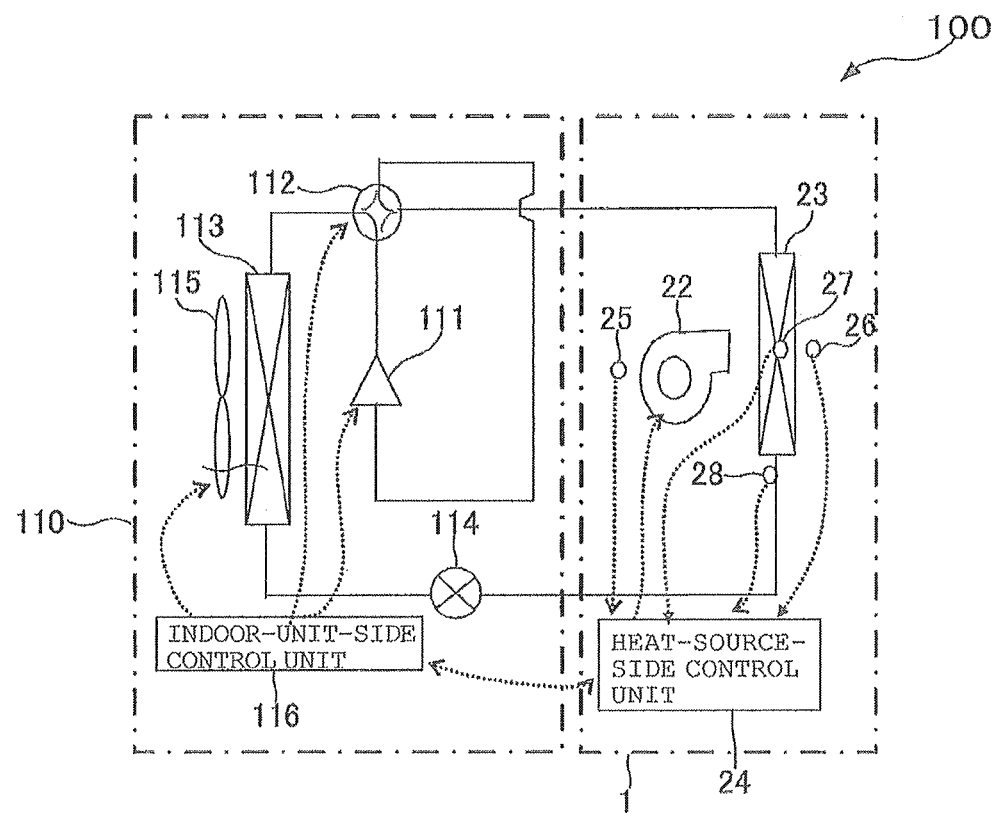
FIG. 2 is a refrigerant circuit diagram showing the refrigerant circuit configuration of the air-conditioning apparatus.

The indoor unit 1 is provided in common with each air-conditioning target area (the function thereof is described in detail in FIG. 2). The branch duct 2 is configured to branch air-conditioned air supplied from the indoor unit 1 into the ducts 3 connected thereto. The ducts 3 guide the air-conditioned air supplied via the branch duct 2 into the individual air-conditioning target areas. The dampers 4 adjust the airflow of the air-conditioned air supplied to the air-conditioning target areas under control of the operation. Here, the dampers 4 are provided in the ducts 3 connected to the room B, room C, and room D.

The damper controllers 5 control the dampers 4 in accordance with instructions from the damper remote controllers 7. The dampers 4 and the damper controllers 5 may either of an electronic variable airflow type that can linearly control the opening-degrees or a switching type that simply opens and closes them. The damper controllers 5 each determine the opening-degree of the corresponding damper 4 in accordance with the difference between a set temperature set by the damper remote controller 7 and a detected temperature. For example, when the detected temperature has not yet reached the set temperature, the opening-degree of the damper 4 is opened, and when the detected temperature has reached the set temperature, the opening-degree of the damper 4 is closed. In the case where the damper 4 is of the electronic variable airflow type and when the difference between the detected temperature and the set temperature is small, the damper 4 is controlled so that the size of the opening-degree is decreased.

The air blowout ports 6 are provided in the air-conditioning target areas and blow air-conditioned air supplied through the branch duct 2 and the ducts 3 into the air-conditioning target areas. The damper remote controllers 7 are provided in the air-conditioning target areas (here, room B, room C, and room D) to which the ducts 3 provided with the dampers 4 are connected. The damper remote controllers 7 are each equipped with a temperature sensor (not shown) for measuring the temperature (the temperature of the air-conditioning target area) for determining the opening-degree of the corresponding damper 4. The indoor-unit remote controller 8 is provided in the air-conditioning target area to which the duct 3 that is not provided with the damper 4 is connected (here, room A). The intake port 9 supplies air serving as air-conditioned air to the indoor unit 1.

The dampers 4, the damper controllers 5, and the damper remote controllers 7 are independent from one another in terms of control, with no electrical connection, such as communication, with the indoor unit 1. The damper remote controllers 7 are connected to the damper controllers 5 in a wired or wireless manner. Likewise, the indoor-unit remote controller 8 is also connected to the indoor unit 1 in a wired or wireless manner. Furthermore, although an example in which the intake port 9 is provided only in the room A is shown, the present invention is not limited thereto; the intake port 9 may be provided in another air-conditioning target area.

FIG. 2 is a refrigerant circuit diagram showing the refrigerant circuit configuration of the air-conditioning apparatus 100. The refrigerant circuit configuration of the air-conditioning apparatus 100 will be described on the basis of FIG. 2. The air-conditioning apparatus 100 includes the indoor unit 1 described above and a heat-source-side unit 110 connected by piping to the indoor unit. The numbers of the heat-source-side unit 110 and the indoor unit 1 are not limited to the numbers shown in the drawing. Although the installation site of the heat-source-side unit 110 is not shown in FIG. 1, the heat-source-side unit 110 may be installed, for example, on the roof or in the roof-space of a building.

[Heat-Source-Side Unit 110]

The heat-source-side unit 110 supplies and removes heat to and from the indoor unit 1. This heat-source-side unit 110 accommodates a compressor 111, a four-way valve 112 that is a refrigerant-channel switching device, a heat-source-side heat exchanger 113, and a throttle device 114 which are connected in series through a refrigerant pipe. In addition, a heat-source-side fan 115 is provided in the vicinity of the heat-source-side heat exchanger 113 of the heat-source-side unit 110. Furthermore, the heat-source-side unit 110 is provided with a heat-source-side control unit 116 that controls the drive frequency of the compressor 111, switching of the four-way valve 112, and the rotation speed of the heat-source-side fan 115.

The compressor 111 takes in refrigerant and compresses the refrigerant into a high-temperature, high-pressure state and may be constituted by, for example, a capacity-controllable inverter compressor. The four-way valve 112 switches the refrigerant between a flow during heating operation and a flow during cooling operation. The heat-source-side heat exchanger 113 functions as an evaporator during heating operation and functions as a condenser during cooling operation and exchanges heat between air supplied from the heat-source-side fan 115 and the refrigerant to evaporate the refrigerant into gas or to condense the refrigerant into liquid. The throttle device 114 functions as a pressure reducing valve or a throttle device and expands the refrigerant by reducing the pressure. The throttle device 114 may be constituted by a device whose opening-degree can be variably controlled, for example, an electronic expansion valve.

The heat-source-side fan 115 supplies air to the heat-source-side heat exchanger 113. The heat-source-side fan 115 may be constituted by a fan whose output can be freely changed by the heat-source-side control unit 116 and whose airflow is variable. The heat-source-side control unit 116 is constituted by, for example, a computer (calculating unit), a storage unit, and a power source, and controls the drive frequency of the compressor 111, switching of the four-way valve 112, and the rotation speed of the heat-source-side fan 115 on the basis of information sent from an indoor-unit-side control unit 24 of the indoor unit 1, to be described later. The heat-source-side control unit 116 can communicate with the indoor-unit-side control unit 24, to be described later, in a wired or wireless manner.

[Indoor Unit 1]

The indoor unit 1 supplies air-conditioned air (cooling air or heating air) to the air-conditioning target areas. The indoor unit 1 is equipped with an indoor-unit-side heat exchanger 23 connected by piping to the throttle device 114 and the four-way valve 112 of the heat-source-side unit 110. An indoor-unit-side fan 22 is provided in the vicinity of the indoor-unit-side heat exchanger 23 of the indoor unit 1. The indoor-unit-side fan 22 is constituted by a fan whose output can be freely changed by the indoor-unit-side control unit 24 and whose airflow is variable. Furthermore, the heat-source-side unit 110 is provided with the indoor-unit-side control unit 24 that controls the rotation speed of the indoor-unit-side fan 22.

The indoor-unit-side heat exchanger 23 exchanges heat between air supplied from the indoor-unit-side fan 22 and the refrigerant to generate air-conditioned air to be supplied to the air-conditioning target areas. The indoor-unit-side fan 22 supplies air to the indoor-unit-side heat exchanger 23. The indoor-unit-side control unit 24 serving as a controller is constituted by, for example, a computer (calculating unit), a storage unit, and a power source, and is configured to control the rotation speed of the indoor-unit-side fan 22 in communication with the heat-source-side control unit 116 of the heat-source-side unit 110 on the basis of information sent from various sensors, to be described later.

Furthermore, the indoor unit 1 is provided with a liquid-temperature sensor 28, a gas-liquid two-phase temperature sensor 27, an intake-air temperature sensor 25, and a blown-out-air temperature sensor 26. The liquid-temperature sensor 28 is provided between the indoor-unit-side heat exchanger 23 and the throttle device 114 and in the vicinity of the indoor-unit-side heat exchanger 23 and detects the temperature of a pipe through which liquid refrigerant passes. Examples of the liquid-temperature sensor 28 include a thermistor, a thermometer, and a temperature sensor. The gas-liquid two-phase temperature sensor 27 is provided in the indoor-unit-side heat exchanger 23 and detects the temperature of the pipe in the vicinity of the center of the path of the indoor-unit-side heat exchanger 23 through which gas-liquid two-phase refrigerant passes (to be described in detail in Embodiment 3). Examples of the gas-liquid two-phase temperature sensor 27 include a thermistor, a thermometer, and a temperature sensor.

The intake-air temperature sensor 25 is provided at the air intake side of the indoor-unit-side fan 22 (at the inlet of the air channel in the indoor unit 1) and detects the temperature of air taken into the indoor-unit-side fan 22. Examples of the intake-air temperature sensor 25 include a thermistor, a thermometer, and a temperature sensor. The blown-out-air temperature sensor 26 is provided at the outlet of the air channel in the indoor unit 1 and detects the temperature of air-conditioned air blown into the air-conditioning target areas. Examples of the blown-out-air temperature sensor 26 include a thermistor, a thermometer, and a temperature sensor.

Temperature information detected by the liquid-temperature sensor 28, the gas-liquid two-phase temperature sensor 27, the intake-air temperature sensor 25, and the blown-out-air temperature sensor 26 are sent to the indoor-unit-side control unit 24, and various control operations are executed by the indoor-unit-side control unit 24 and the heat-source-side control unit 116 on the basis of the temperature information. Furthermore, the temperature information detected by the liquid-temperature sensor 28 and the gas-liquid two-phase temperature sensor 27 is used to determine the opening-degree of the throttle device 114. Furthermore, when the temperature information detected by the blown-out-air temperature sensor 26 reaches a temperature set by the indoor-unit remote controller 8, the heating operation is stopped.

The air-conditioning apparatus 100 is configured such that the compressor 111, the four-way valve 112, the heat-source-side heat exchanger 113, the throttle device 114, and the indoor-unit-side heat exchanger 23 are connected in series by the refrigerant piping to configure a refrigerant cycle circuit during cooling operation. Furthermore, the air-conditioning apparatus 100 is configured such that the compressor 111, the four-way valve 112, the indoor-unit-side heat exchanger 23, the throttle device 114, and the heat-source-side heat exchanger 113 are connected in series by the refrigerant piping by switching the four-way valve 112 to configure a refrigerant cycle circuit during heating operation.

Figure 3:
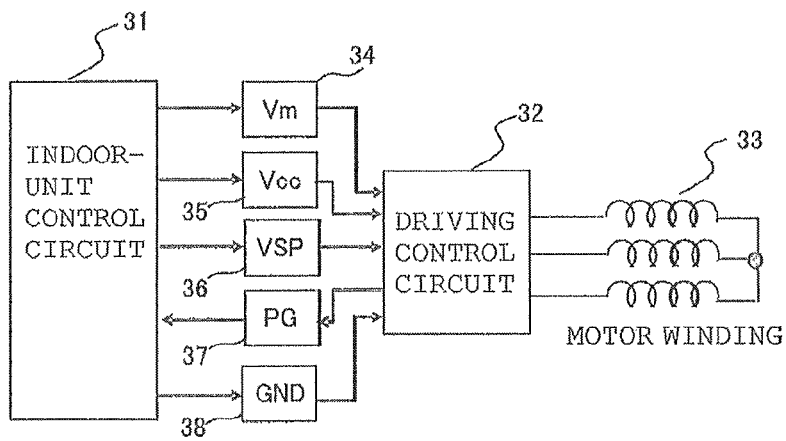
FIG. 3 is a schematic diagram showing the electrical circuit configuration of an indoor-unit-side control unit.

FIG. 3 is a schematic diagram showing the electrical circuit configuration of the indoor-unit-side control unit 24. The electrical circuit configuration of the indoor-unit-side control unit 24 related to fan control (rotation speed control of the indoor-unit-side fan 22) will be described on the basis of FIG. 3. The fan control circuit of the indoor-unit-side control unit 24 is, in outline, constituted by an indoor-unit control circuit 31, a motor-driving control circuit 32, and motor winding 33. Power lines and control lines that connect the indoor-unit control circuit 31 and the motor-driving control circuit 32 together include a motor-driving power source (Vm) 34, a driving-control-circuit voltage (Vcc) 35, a speed-instruction voltage (VSP) 36, a motor-rotation pulse signal (PG) 37, and a GND 38.

The indoor-unit control circuit 31 has a function of transmitting an instruction to the motor-driving control circuit 32 through the power lines or and the control lines to control the rotation speed of the indoor-unit-side fan 22. The motor-driving control circuit 32 has a function of controlling the rotation speed of the indoor-unit-side fan 22 in accordance with an instruction from the indoor-unit control circuit 31. That is, the motor-driving control circuit 32 determines power to be supplied to the motor winding 33 in response to an instruction from the indoor-unit control circuit 31, thereby executing rotation speed control including the driving/stopping of the indoor-unit-side fan 22. The motor winding 33 actually drives/stops the indoor-unit-side fan 22 in accordance with power supply.

The speed-instruction voltage 36 is determined by the indoor-unit control circuit 31 and allows a desired instruction within a predetermined range to be transmitted to the motor-driving control circuit 32. The output of the indoor-unit-side fan 22 is also changed in accordance with the speed-instruction voltage 36. That is, when the speed-instruction voltage 36 determined by the indoor-unit control circuit 31 is at the maximum, the output of the indoor-unit-side fan 22 also becomes the maximum, and when the speed-instruction voltage 36 determined by the indoor-unit control circuit 31 is at the minimum, the output of the indoor-unit-side fan 22 also becomes the minimum.

Figure 4:
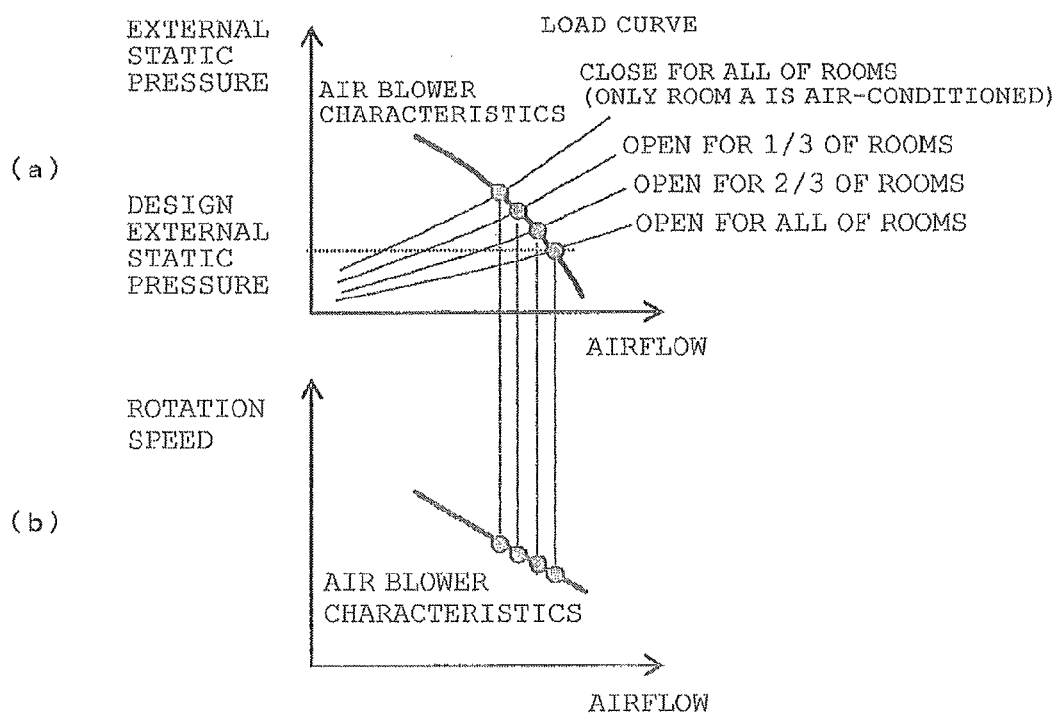
FIG. 4 is an explanatory diagram for explaining the characteristics of an indoor-unit-side fan.
Figure 5:
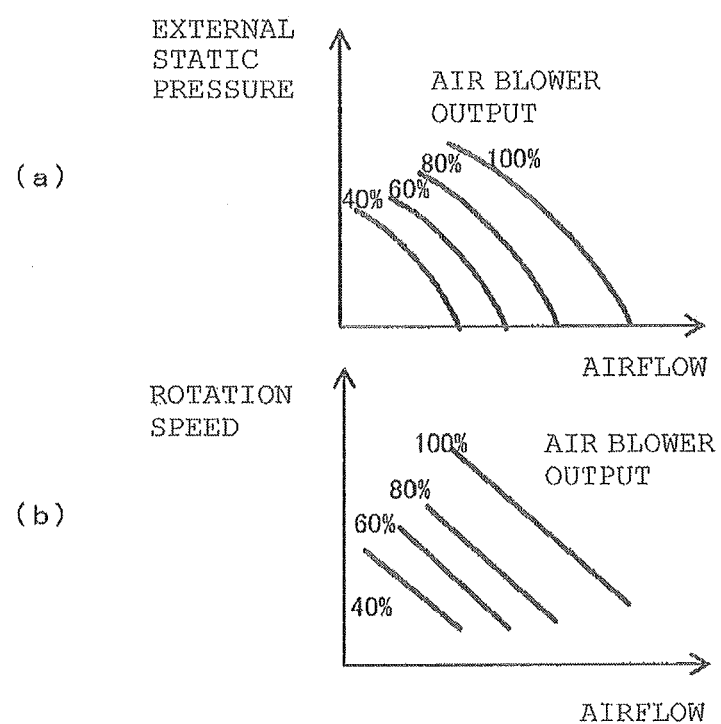
FIG. 5 is an explanatory diagram for explaining the characteristics of the indoor-unit-side fan.

FIG. 4 and FIG. 5 are explanatory diagrams for explaining the characteristics of the indoor-unit-side fan 22. FIG. 4(a) and FIG. 5(a) are fan characteristic diagrams showing the relationship between the external static pressure (vertical axis) and the airflow (horizontal axis), and FIG. 4(b) and FIG. 5(b) are fan characteristic diagrams showing the relationship between the rotation speed (vertical axis) and the airflow (horizontal axis). The outline of the characteristics of the indoor-unit-side fan 22 will be described on the basis of FIG. 4 and FIG. 5. FIG. 5 shows the characteristics of the indoor-unit-side fan 22 when the relationship between the fan output (airflow) and the external static pressure and rotation speed is measured in advance.

A centrifugal multiblade fan is used as an example of the indoor-unit-side fan 22. This is because in a centrifugal multiblade fan generally the airflow tends to decrease and the rotation speed tends to increase with increasing static pressure and thus the fan has the characteristic that the airflow changes due to changes in external static pressure as the dampers 4 are opened and closed. In system designing, a design external static pressure is generally estimated from pressure losses of the air channels of the ducts 3, the branch duct 2, the dampers 4, the air blowout ports 6, the intake port 9, and so on. At that time, all the dampers 4 are normally fully open. As the dampers 4 are closed (open for all of the rooms→open for ⅔ of the rooms→open for ⅓ of the rooms→close for all of the rooms (only the room A is air-conditioned)), the external static pressure tends to increase along the curve shown in FIG. 4(a), and at the same time, the airflow tends to decrease. On the other hand, the rotation speed tends to increase, as shown in FIG. 4(b).

Thus, the air-conditioning apparatus 100 according to Embodiment 1 measures such tendencies in advance, as shown in FIG. 5, and stores them in a tabular form or as an approximate expression in the indoor-unit-side control unit 24. Thus, the indoor-unit-side control unit 24 can find the external static pressure (the static pressure outside the indoor unit 1) and the airflow by performing arithmetic operation from the known output and rotation speed of the fan (that is, the characteristics of the indoor-unit-side fan 22 measured in advance).

Figure 6:
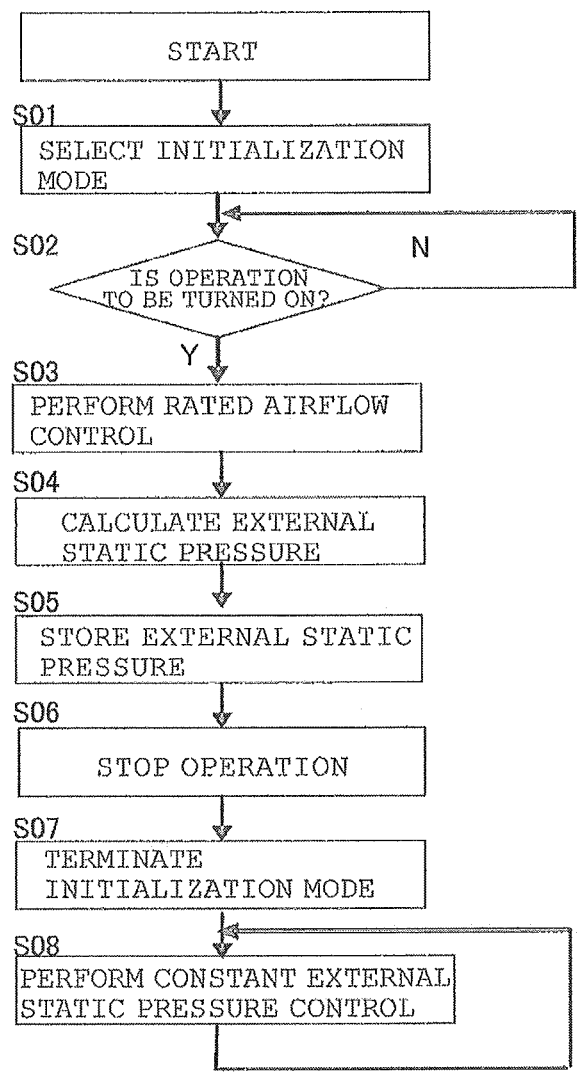
FIG. 6 is a flowchart showing an example of the flow of the process of controlling the rotation speed of the indoor-unit-side fan.

FIG. 6 is a flowchart showing an example of the flow of the process of controlling the rotation speed of the indoor-unit-side fan 22. The outline of the process of fan control during system designing using the characteristics of the indoor-unit-side fan 22, described in FIG. 4 and FIG. 5 will be described on the basis of FIG. 6. When executing initialization of the indoor-unit-side fan 22 of the air-conditioning apparatus 100 installed, the contractor first selects an initialization mode from a preinstalled remote control menu for performing initialization (S01). At that time, all the dampers 4 are fully opened.

After completion of the preparation of the dampers 4, the operation is turned ON (S02: Y), and the indoor-unit-side control unit 24 performs fan control so that the airflow becomes a rated airflow (S03). After the rotation speed of the indoor-unit-side fan 22 becomes stable, the indoor-unit-side control unit 24 calculates an external static pressure at that time (S04) and stores the external static pressure in storage means (not shown), such as a nonvolatile memory, mounted in the indoor-unit control unit 24 (S05). After completion of the storage, the indoor-unit-side control unit 24 stops the operation once (S06) and terminates the initialization mode (S07). After that, the indoor-unit-side fan 22 enters a normal mode, and the indoor-unit-side control unit 24 performs fan control so that the calculated external static pressure reaches a predetermined value (S08). The content stored in the nonvolatile memory may be applicable to another type of fan.

FIG. 7 is a flowchart showing the flow of the process from S03 to S05 in FIG. 6 in detail. The flow of the process from S03 to S05 in FIG. 6 will be described in more detail on the basis of FIG. 7. First, the indoor-unit-side control unit 24 (specifically, the motor-driving control circuit 32) outputs the speed-instruction voltage 36 from the indoor-unit control circuit 31, as an initial value VSP0, to the motor winding 33 (S1). After the motor rotates and is stabilized, the indoor-unit-side control unit 24 measures a motor rotation speed N (S2).

Next, the indoor-unit-side control unit 24 calculates an airflow Q using an empirical formula f (N, VSP0) for calculating the airflow (S3). Then, the indoor-unit-side control unit 24 determines whether the calculated airflow Q is larger or smaller than a rated airflow Q0+A (S4). If it is determined that the airflow Q is larger than the rated airflow Q0+A (S4: Y), then the indoor-unit-side control unit 24 decreases the value of the speed instruction voltage VSP by −α (S5). Then, the indoor-unit-side control unit 24 returns to S2 and continues the process. On the other hand, if the airflow Q is determined to be smaller than the rated airflow Q0+A (S4: N), then the indoor-unit-side control unit 24 determines whether the airflow Q is larger or smaller than the rated airflow Q0−A (S6).

When the airflow Q is smaller than the rated airflow Q0−A (S6: Y), the indoor-unit-side control unit 24 increases the value of the speed instruction voltage VSP by +α (S7). Then, the indoor-unit-side control unit 24 returns to S2 and continues operations. On the other hand, when the airflow Q is larger than the rated airflow Q0−A (S6: N), the indoor-unit-side control unit 24 determines that the airflow Q comes within the range of rated airflow±A. Next, the indoor-unit-side control unit 24 calculates the external static pressure (S8) and stores the calculated external static pressure P0 in the nonvolatile memory (S9).

FIG. 8 is a flowchart showing the flow of the process of S08 in FIG. 6 in detail. The flow of the process of S08 in FIG. 6 will be described in more detail on the basis of FIG. 8. The indoor-unit-side control unit 24 measures the motor rotation speed N during the operation of the motor (S22). Next, the indoor-unit-side control unit 24 calculates the airflow Q using the empirical formula f (N, VSP) for calculating the airflow (S23). Furthermore, the indoor-unit-side control unit 24 calculates an external static pressure P using an empirical formula g (Q, VSP) for calculating the external static pressure P (S24).

Then, the indoor-unit-side control unit 24 determines whether the calculated external static pressure P is larger or smaller than an initial external static pressure P0+B (S25). If the external static pressure P is larger than the initial external static pressure P0+B (S25: Y), then the indoor-unit-side control unit 24 decreases the value of the speed instruction voltage VSP by $\alpha$ (S26). Then, the indoor-unit-side control unit 24 returns to S22 and continues the process. On the other hand, if the external static pressure P is smaller than the initial external static pressure P0+B (S25: N), then the indoor-unit-side control unit 24 determines whether the external static pressure P is larger or smaller than the initial external static pressure P0−B (S27).

If the external static pressure P is smaller than the initial external static pressure P0−B (S27: Y), then the indoor-unit-side control unit 24 increases the value of the speed instruction voltage VSP by $\alpha$ (S28). Then, the indoor-unit-side control unit 24 returns to S22 and continues the process. On the other hand, if the external static pressure P is larger than the initial external static pressure P0−B (S27: N), then the indoor-unit-side control unit 24 determines that the external static pressure P falls within the range of the initial external static pressure P0±B and maintains the VSP as it is (S29). Then, the indoor-unit-side control unit 24 returns to S22 and continues the process.

Referring to FIG. 3, if the source voltage differs even with the same speed-instruction voltage 36, the output of the motor-driving power source 34 increases along therewith. Thus, the fan characteristics also show a tendency to change, as shown in FIG. 9. Therefore, the empirical formulas f (N, VSP) and g (Q, VSP) shown in FIG. 6 to FIG. 8 are set in accordance with a source voltage used. FIG. 9 is a fan characteristic diagram showing the relationship between the external static pressure (vertical axis) and the airflow (horizontal axis), as shown in FIG. 4(a) and FIG. 5(a).

FIG. 10 is an explanatory diagram for explaining the relationship between the airflow and the performance of the indoor-unit-side fan 22. FIG. 10(a1) shows the relationship between the performance ratio (vertical axis) and the rated airflow (horizontal axis) of the indoor-unit-side fan 22 during cooling operation; FIG. 10(a2) shows the relationship between the blowout temperature (vertical axis) and the rated airflow (horizontal axis) of the indoor-unit-side fan 22 during cooling operation; FIG. 10(b1) shows the relationship between the performance ratio (vertical axis) and the rated airflow (horizontal axis) of the indoor-unit-side fan 22 during heating operation; and FIG. 10(b2) shows the relationship between the blowout temperature (vertical axis) and the rated airflow (horizontal axis) of the indoor-unit-side fan 22 during heating operation. The relationship between the airflow and the performance of the indoor-unit-side fan 22 will be described on the basis of FIG. 10.

Fan control has been described using the diagrams up to FIG. 9. In the case where the airflow is controlled so that it becomes small, the blown-out-air temperature of the indoor unit 1 generally tends to decrease with a decrease in airflow during cooling operation (FIG. 10(a2)), and to increase with a decrease in airflow during heating operation (FIG. 10(b2)). Sign Tout0 shown in FIG. 10 denotes a blowout temperature at a rated capacity. In the case where the damper 4 is closed to decrease the airflow, the blowout temperature of a room for which the opening-degree of the damper 4 is not changed changes to provide an excessive capacity; therefore, the compressor capacity is controlled so that the blown-out-air temperature of the indoor unit 1 becomes a predetermined temperature.

Figure 11:
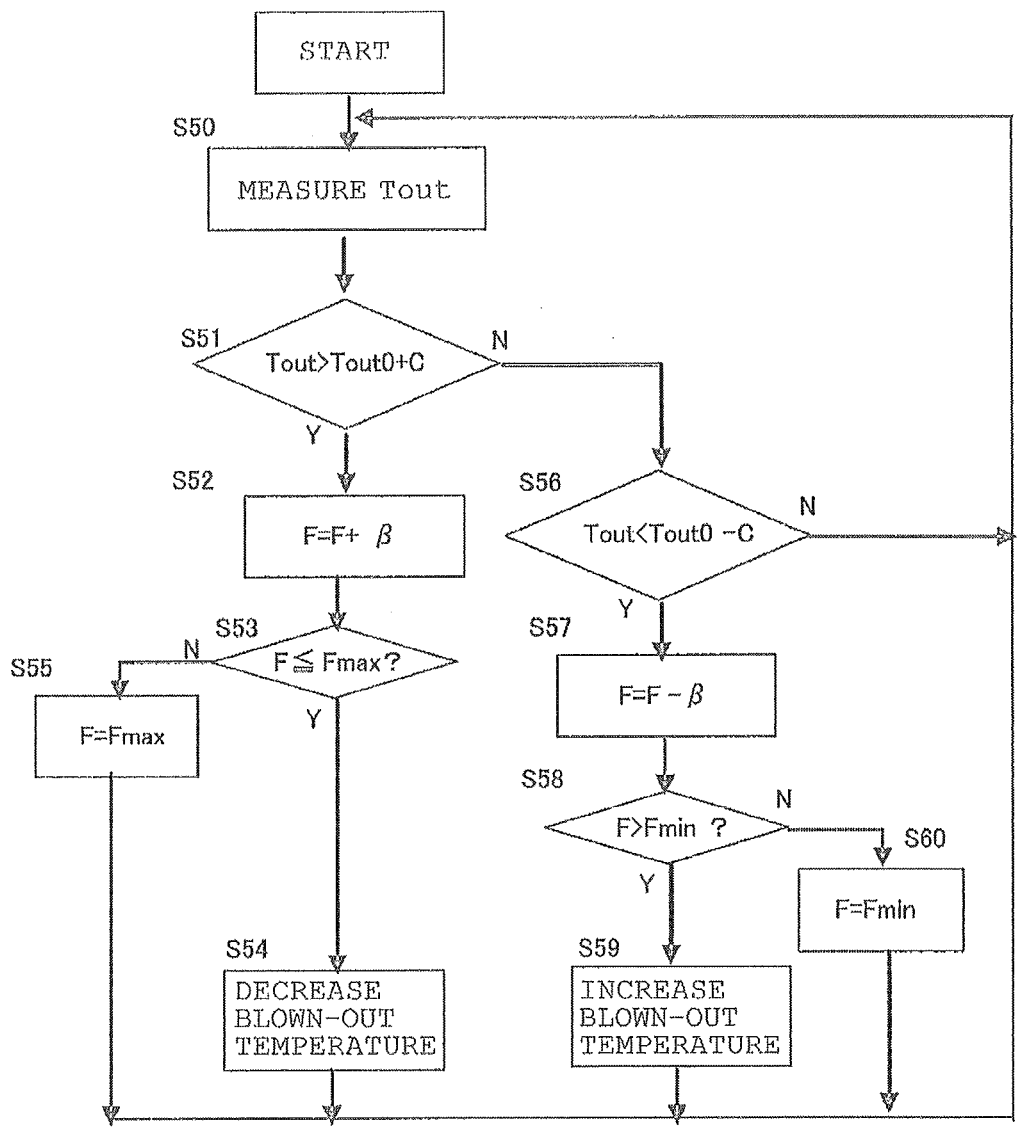
FIG. 11 is a flowchart showing the flow of the process of controlling the compressor capacity during cooling operation.

FIG. 11 is a flowchart showing the flow of the process of controlling the compressor capacity during cooling operation. The flow of the process of controlling the compressor capacity during cooling operation will be described on the basis of FIG. 11. The blown-out-air temperature sensor 26 measures the temperature of air blown into the air-conditioning target areas (detection temperature Tout) (S50). The detection temperature Tout measured by the blown-out-air temperature sensor 26 is sent to the heat-source-side control unit 116 via the indoor-unit-side control unit 24. The heat-source-side control unit 116 that has received the detection temperature Tout determines whether the detection temperature Tout is larger or smaller than a predetermined value Tout0+C (S51).

If the detection temperature Tout is larger than the predetermined value Tout0+C (S51: Y), then the heat-source-side control unit 116 increases a compressor frequency F (S52) to increase the cooling capacity, thereby decreasing the blowout temperature (S54). If the detection temperature Tout is smaller than the predetermined value Tout0+C (S51: N), then the heat-source-side control unit 116 determines whether the detection temperature Tout is larger or smaller than the predetermined value Tout0−C (S56). If the detection temperature Tout is smaller than the predetermined value Tout0−C (S56: Y), the heat-source-side control unit 116 decreases the compressor frequency F (S57) to decrease the cooling capacity, thereby increasing the blowout temperature (S59).

Thus, the heat-source-side control unit 116 controls the blowout temperature Tout so that it reaches the predetermined value Tout0. The compressor frequency F is limited to the upper limit Fmax (see S53) and to the lower limit Fmin (see S58). Here, the predetermined value Tout0 is an assumed blowout temperature when the rated capacity is offered, which is a constant stored in the heat-source-side control unit 116 in advance.

Figure 12:
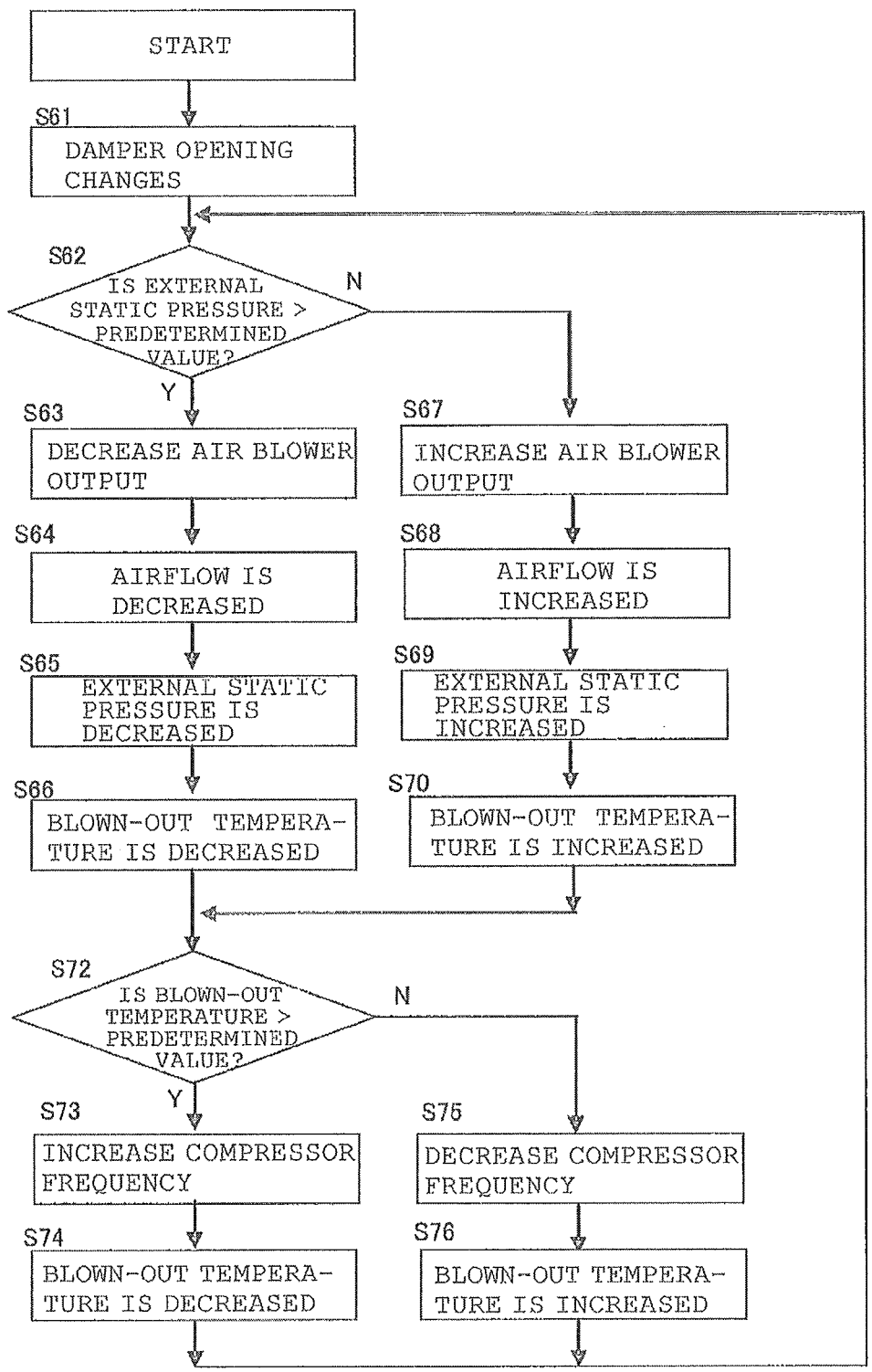
FIG. 12 is a flowchart showing fan control and blowout temperature control together.

FIG. 12 is a flowchart showing the fan control and the blowout temperature control together. The fan control and the blowout temperature control will be described together on the basis of FIG. 12. Since the air-conditioning apparatus 100 performs the fan control and the blowout temperature control of the indoor unit 1 in accordance with changes in external static pressure due to the operation of the dampers 4 in this way, the dampers 4 and the damper controllers 5 therefor, and the damper remote controllers 7 can be configured as independent systems, which increases the flexibility of selection of the dampers 4. The air-conditioning apparatus 100 controls the external static pressure and the airflow without using a static-pressure detector and controls the compressor capacity on the basis of the blowout air temperature, and thus, an inexpensive air-conditioning apparatus can easily be provided.

Embodiment 2

Figure 13:
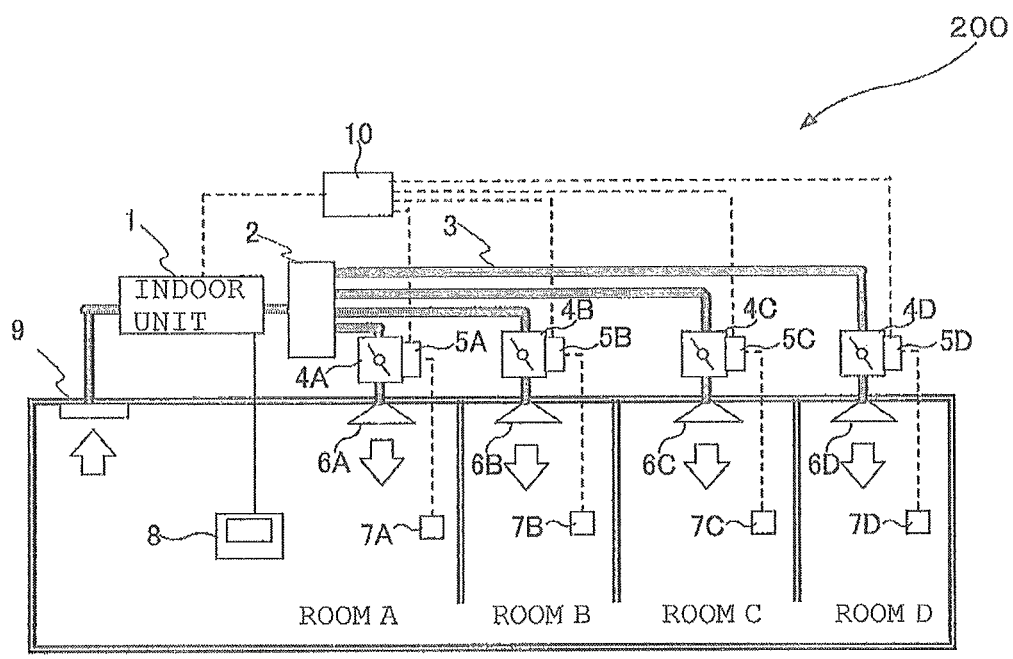
FIG. 13 is a schematic diagram showing an example of the system configuration of an air-conditioning apparatus according to Embodiment 2.

FIG. 13 is a schematic diagram showing an example of the system configuration of an air-conditioning apparatus 200 according to Embodiment 2 of the present invention. The system configuration (an example of installation in an architectural structure) of the air-conditioning apparatus 200 will be described on the basis of FIG. 13. The air-conditioning apparatus 200 is installed in an architectural structure, such as a building or an apartment, and executes air conditioning (cooling operation or heating operation) of air-conditioning target areas (for example, four rooms, that is, room A, room B, room C, and room D in FIG. 13) using a refrigerating cycle that circulates refrigerant. In Embodiment 2, differences from Embodiment 1 will be mainly described, and the same components as those of Embodiment 1 are given the same reference signs.

Although the air-conditioning apparatus 100 according to Embodiment 1 has been described using the example in which the indoor unit 1 is independent from the dampers 4, and fan control is performed so that the external static pressure becomes a predetermined value, the air-conditioning apparatus 200 according to Embodiment 2 is shown using an example in which the damper controllers 5 transmit signals for changing the fan outputs (external input signals) to the indoor unit 1, and the indoor unit 1 changes the fan outputs and compressor capacity in accordance with the received signals. The basic system configuration of the air-conditioning apparatus 200 is the same as that of the air-conditioning apparatus 100.

The air-conditioning apparatus 200 includes, in addition to the configuration of the air-conditioning apparatus 100, a centralized damper controller 10 connected to the indoor unit 1 and the individual damper controllers 5, a damper 4A, a damper controller 5A, and a damper remote controller 7A. That is, the room A is also provided with the damper 4, the damper controller 5, and the damper remote controller 7. The dampers 4 and the damper controllers 5 may either of an electronic variable airflow type that can linearly control the opening-degrees or a switching type that simply opens and closes them.

The damper remote controller 7A is equipped with a temperature sensor (not shown) for measuring the temperature (the temperature of the air-conditioning target area) for determining the opening-degree of the damper 4A and an calculating portion that adjusts the opening-degree of the damper 4A in accordance with the difference between the set temperature set by the damper remote controller 7A and a detected temperature and calculates a necessary airflow. The calculated necessary airflow is transmitted to the centralized damper controller 10. The centralized damper controller 10 collects information from the individual dampers 4 and calculates a necessary airflow to be blown from the indoor unit 1. The calculated necessary airflow is transmitted to the indoor unit 1, and the indoor unit 1 performs fan control and compressor control on the basis of the information.

FIG. 14 is a flowchart showing an example of the flow of the process of controlling the rotation speed of the indoor-unit-side fan 22. The outline of the process of fan control during system designing using the characteristics of the indoor-unit-side fan 22 will be described on the basis of FIG. 14. When executing initialization of the indoor-unit-side fan 22 of the installed air-conditioning apparatus 200, the contractor first selects an initialization mode from a preinstalled remote control menu for performing initialization (S81). At that time, all the dampers 4 are fully opened.

After completion of the preparation of the dampers 4, the operation is turned ON (S82: Y), and the indoor-unit-side control unit 24 performs fan control so that the airflow becomes a rated airflow (S83). The rotation speed of the indoor-unit-side fan 22 becomes stable, the indoor-unit-side control unit 24 calculates an external static pressure at that time (S84) and stores the external static pressure in storage means (not shown), such as a nonvolatile memory, mounted in the indoor-unit control unit 24 (S85). After completion of the storage, the indoor-unit-side control unit 24 stops the operation once (S86) and terminates the initialization mode (S87). After that, the fan enters a normal mode, and the indoor-unit-side control unit 24 performs fan control so that the calculated external static pressure does not exceed a predetermined value stored (S88, S90) and performs fan output control in response to external input signals (S89).

Figure 15:
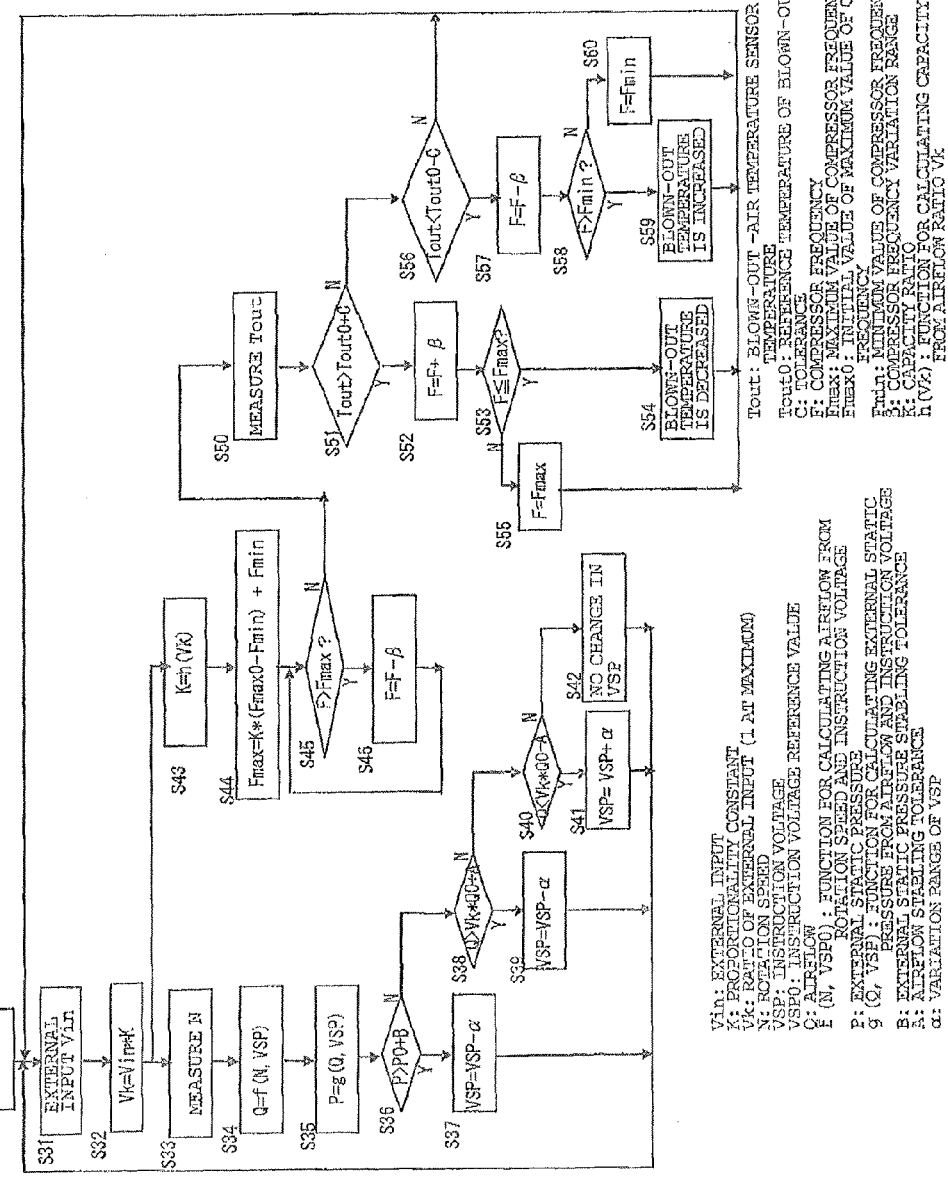
FIG. 15 is a flowchart showing the flow of the process from S88 to S90 in FIG. 14 in detail.

FIG. 15 is a flowchart showing the flow of the process from S88 to S90 in FIG. 14 in detail. The flow of the process from S88 to S90 in FIG. 14 will be described in more detail on the basis of FIG. 15. The indoor unit 1 receives a signal from the centralized damper controller 10 as an external input Vin (S31), and the indoor-unit-side control unit 24 converts it to a ratio to a rated fan output (S32). Next, the indoor-unit-side control unit 24 measures a motor rotation speed N during the operation of the motor (S33).

Next, the indoor-unit-side control unit 24 calculates an airflow Q using an empirical formula f (N, VSP) for calculating the airflow (S34). Furthermore, the indoor-unit-side control unit 24 calculates an external static pressure P using an empirical formula g (Q, VSP) for calculating the external static pressure P (S35). Then, the indoor-unit-side control unit 24 determines whether the calculated airflow Q is larger or smaller than an initial external static pressure P0+B (S36). If it the external static pressure P0 is larger than the initial external static pressure P0+B (S36: Y), then the indoor-unit-side control unit 24 reduces the value of the speed instruction voltage VSP by $\alpha$ (S37). Then, the indoor-unit-side control unit 24 returns to S31 and continues the process.

On the other hand, if the external static pressure P is smaller than the initial external static pressure P0+B (S36: N), the indoor-unit-side control unit 24 compares the airflow Q calculated in S34 with an instructed airflow Vk*Q0 according to the external input (S38) and increases or decreases the fan output VSP so that the difference between the airflow Q and the instructed airflow Vk*Q0 (S38, S40) is decreased (S39, S41). Capacity control of the compressor 11 is also performed on the basis of information on the external input (S43 to S46). For blowout temperature control, the same operation as described using FIG. 11 in Embodiment 1 is performed (S50 to S60). Accordingly, even if an actual airflow decreases sharply due to sudden changes in the dampers 4, the compressor capacity can be changed in accordance with the external input together with the fan output, which facilitates coping with rapid changes.

Figure 16:
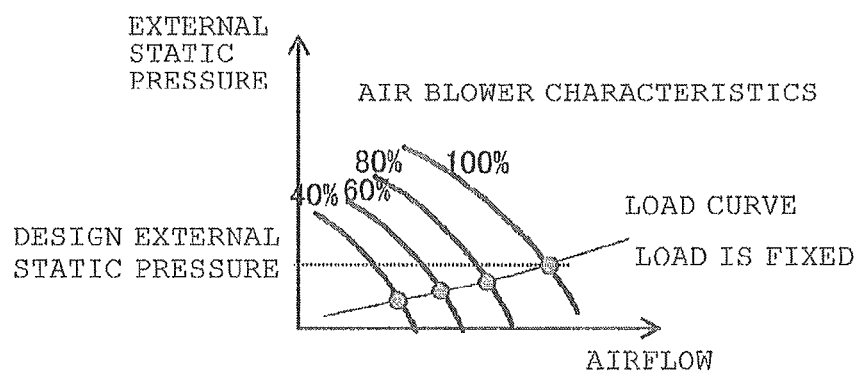
FIG. 16 is a fan characteristic diagram showing the relationship between the airflow and the external static pressure.

FIG. 16 is a fan characteristic diagram showing the relationship between the airflow (horizontal axis) and the external static pressure (vertical axis). The characteristics of the indoor-unit-side fan 22 will be described on the basis of FIG. 16. The operation point moves on the load curve in FIG. 16 by performing control such that the fan output is small, with the opening-degrees of the dampers 4 fixed. This allows a fan driving force to be suppressed as compared with a case in which the fan output is controlled so that the external static pressure is kept constant, thereby reducing power consumption. In Embodiment 2, the fan output is controlled so that the external static pressure that changes with opening-degree and closing of the dampers 4 does not exceed a predetermined value, and the target airflow is changed in response to an external input signal, on the basis of which the fan output is further controlled, which allows further power-saving operation.

Embodiment 3

An air-conditioning apparatus according to Embodiment 3 of the present invention performs control without using the blown-out-air temperature sensor 26 of the indoor unit 1 for use in blown-out temperature control of the air-conditioning apparatuses according to Embodiment 1 and Embodiment 2 but using the pipe temperature sensor (gas-liquid two-phase temperature sensor 27 described in Embodiment 1). The fan control of the air-conditioning apparatus according to Embodiment 3 employs the same configuration and the same operation as those of the air-conditioning apparatuses according to Embodiment 1 and Embodiment 2. The system configuration of the air-conditioning apparatus according to Embodiment 3 is the same as those of the air-conditioning apparatuses according to Embodiment 1 and Embodiment 2.

Figure 17:
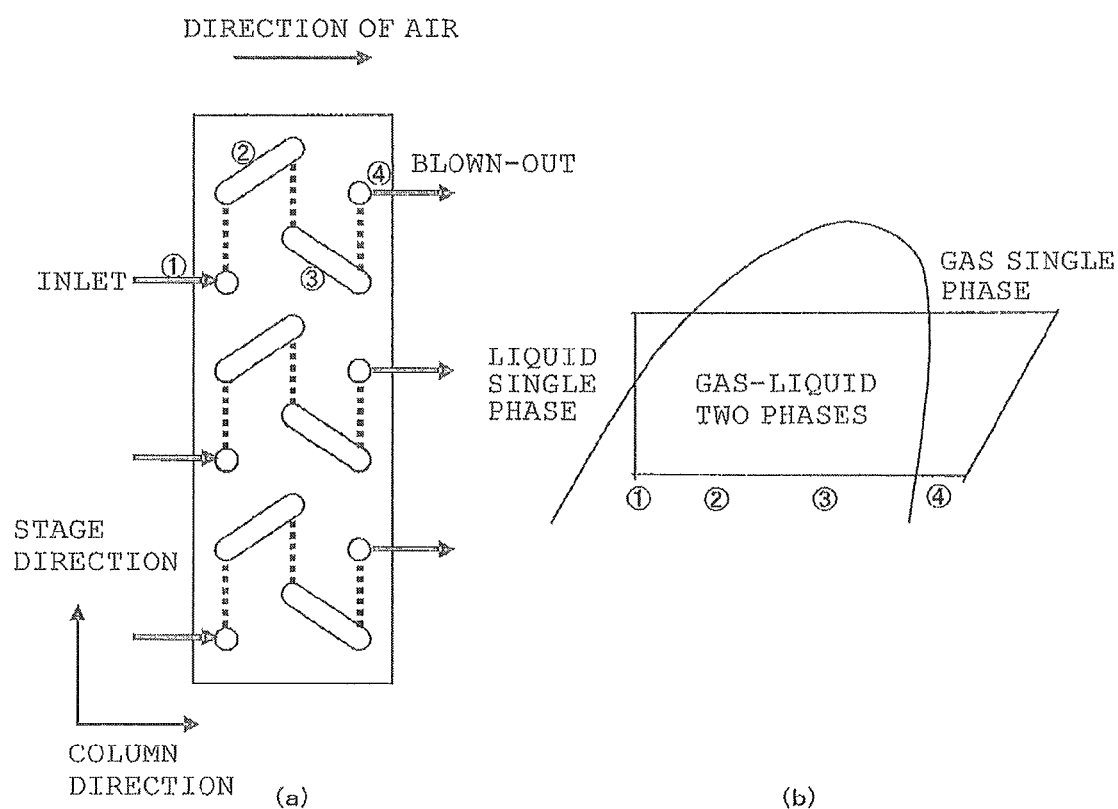
FIG. 17 is an explanatory diagram for explaining the path channels of the indoor-unit-side heat exchanger and the state of the refrigerant at individual portions thereof during cooling operation.

FIG. 17 is an explanatory diagram for explaining the path channels of the indoor-unit-side heat exchanger 23 and the state of the refrigerant at individual portions thereof during cooling operation. FIG. 17(a) is a schematic diagram of the path channels of the indoor-unit-side heat exchanger 23 during cooling operation, and FIG. 17(b) is a P-h diagram. In FIG. 17(a), numerals (1), (2), (3), and (4) are given in the order in which the refrigerant flows in the refrigerant pipe from the inlet to the outlet of a representative path of the indoor-unit-side heat exchanger 23. These positions correspond to (1), (2), (3), and (4) in FIG. 17(b), respectively. The refrigerant is in a gas-liquid two-phase state at (1), (2), and (3), and the refrigerant is in a gas single phase at (4).

FIG. 18 is an explanatory diagram for explaining the path channels of the indoor-unit-side heat exchanger 23 and the state of the refrigerant at individual portions thereof during heating operation. FIG. 18(a) is a schematic diagram of path channels of the indoor-unit-side heat exchanger 23 during heating operation, and FIG. 18(b) is a P-h diagram. In FIG. 18(a), numerals (4), (3), (2), and (1) are given in the order in which the refrigerant flows in the refrigerant pipe from the inlet to the outlet of a representative path of the indoor-unit-side heat exchanger 23. These positions correspond to (4), (3), (2), and (1) in FIG. 18(b), respectively. The refrigerant is in a liquid single phase state at (1), the refrigerant is in a gas-liquid two-phase state at (2) and (3), and the refrigerant is in a gas single phase at (4).

The state of the refrigerant flowing through the path channels of the indoor-unit-side heat exchanger 23 and the indoor-unit-side heat exchanger 23 will be described on the basis of FIG. 17 and FIG. 18. Referring to FIG. 17 and FIG. 18, since the positions (2) and (3) are in the gas-liquid two phase during both cooling operation and heating operation, the pipe-temperature sensor is installed at the positions (2) or (3). In other words, the pipe-temperature sensor is installed in the vicinity of the center of the path of the indoor-unit-side heat exchanger 23. When an azeotropic refrigerant or a pseudo-azeotropic refrigerant is used, the temperature of the gas-liquid two-phase refrigerant is substantially equal to the saturation temperature at a pressure at the position, and thus, it is proportional to the pressure.

A low pressure and a high pressure when a rated capacity is exerted are determined at the time of design. The low pressure tends to drop when the cooling capacity becomes excessive, and the high pressure tends to rise when the heating capacity becomes excessive. Thus, by controlling the compressor frequency so that the pressure does not exceed the designed pressure, energy saving can be achieved. When the airflow becomes small, the low pressure drops during cooling, and the high pressure rises during heating; therefore, to provide a constant blowout temperature, the pressure needs to be kept constant. It is possible to mount a pressure sensor to detect the pressure with this pressure sensor. However, in the case where the refrigerant pipe between the indoor unit 1 and the heat-source-side unit 110 is long or in the case where the amount of flowing refrigerant is large, a pressure loss is increased, which causes the pressure of the heat-source-side unit 110 and the pressure of the indoor unit 1 to differ from each other. Thus, the accuracy is higher when the pressure at the indoor unit 1 side that supplies blown-out air is detected.

Figure 19:
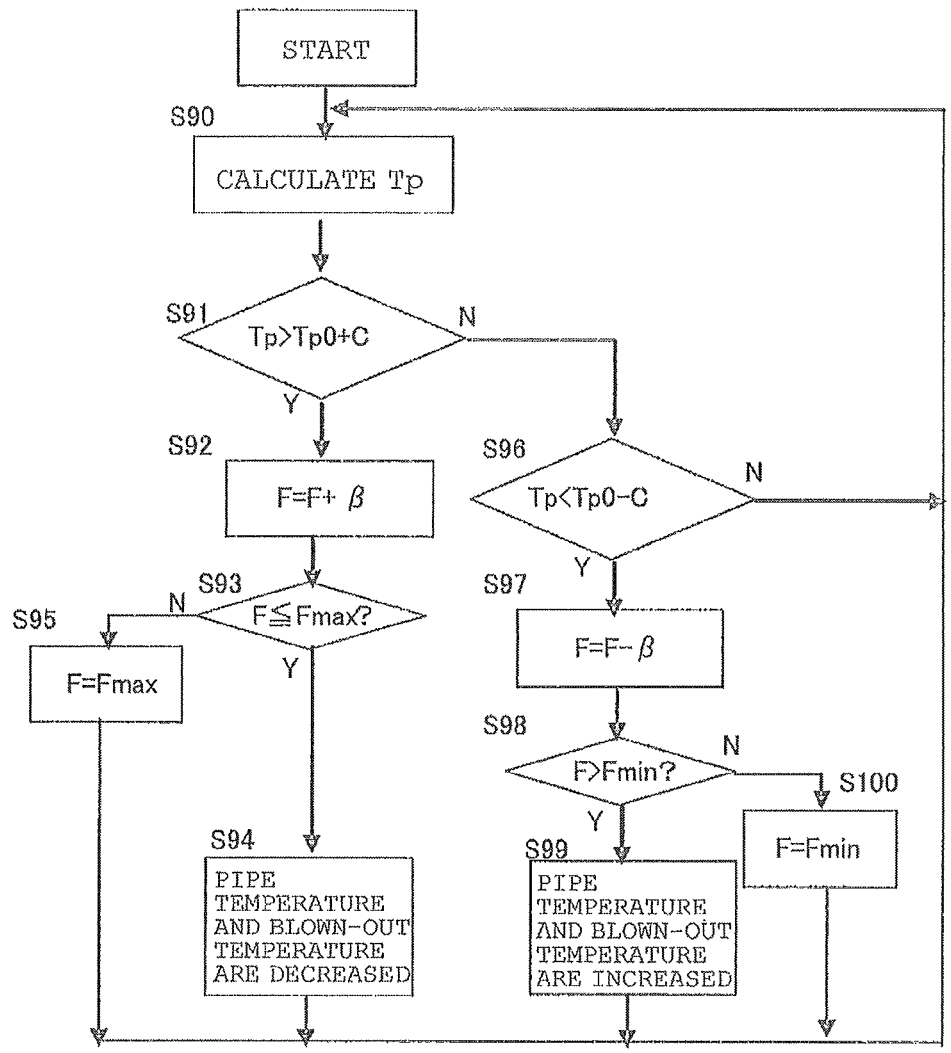
FIG. 19 is a flowchart showing the flow of the control process of an air-conditioning apparatus according to Embodiment 3 during cooling operation.

FIG. 19 is a flowchart showing the flow of the control process of the air-conditioning apparatus according to Embodiment 3 during cooling operation. The control process of the air-conditioning apparatus according to Embodiment 3 during cooling operation will be described on the basis of FIG. 19. The pipe-temperature sensor described in FIG. 17 and FIG. 18 measures the pipe temperature in the vicinity of the installation position (S90). The detection temperature Tp of the pipe-temperature sensor is transmitted to the heat-source-side control unit 116 via the indoor-unit-side control unit 24. The heat-source-side control unit 116 determines whether the detection temperature Tp is larger or smaller than a predetermined value Tp0+C (S91).

If the detection temperature Tp is larger than the predetermined value Tp0+C, then the heat-source-side control unit 116 increases the compressor frequency F (S92) to enhance the cooling capacity, thereby decreasing the refrigerant pipe temperature (S94). If the detection temperature Tp is smaller than the predetermined value Tp0+C (S91: N), then the heat-source-side control unit 116 determines whether the detection temperature Tp is larger or smaller than the predetermined value Tp0−C (S96). If the detection temperature Tp is smaller than the predetermined value Tp0−C (S96: Y), then the heat-source-side control unit 116 decreases the compressor frequency F (S97) to reduce the cooling capacity, thereby increasing the blowout temperature (S99).

Thus, the heat-source-side control unit 116 controls the detection temperature Tp so that it reaches the predetermined value Tp0. The compressor frequency F is limited to the upper limit Fmax (see S93) and to the lower limit Fmin (see S98). Here, the predetermined value Tp0 is an assumed blowout temperature when the rated capacity is offered, which is a constant stored in the heat-source-side control unit 116 in advance. By performing the capacity control of the compressor 111, with a target value set on the two-phase refrigerant pipe temperature during the rated operation, excessive capacity can be suppressed without a blowout temperature sensor.

REFERENCE SIGNS LIST 1 indoor unit (use-side unit), 2 branch duct, 3 duct, 4 damper, 4A damper, 4B damper, 4C damper, 4D damper, 5 damper controller, 5A damper controller, 5B damper controller, 5C damper controller, 5D damper controller, 6 air blowout port, 6A air blowout port, 6B air blowout port, 6C air blowout port, 6D air blowout port, 7 damper remote controller, 7A damper remote controller, 7B damper remote controller, 7C damper remote controller, 7D damper remote controller, 8 indoor-unit remote controller, 9 intake port, 10 centralized damper controller, 22 indoor-unit-side fan (use-side fan), 23 indoor-unit-side heat exchanger (use-side heat exchanger), 24 indoor-unit-side control unit (use-side control unit), 25 intake-air temperature sensor, 26 blown-out-air temperature sensor, 27 gas-liquid two-phase temperature sensor, 28 liquid-temperature sensor, 31 indoor-unit control circuit, 32 motor-driving control circuit, 33 motor winding, 34 motor-driving power source, 35 driving-control-circuit voltage, 36 speed-instruction voltage, 100 air-conditioning apparatus, 110 heat-source-side unit, 111 compressor, 112 four-way valve, 113 heat-source-side heat exchanger, 114 throttle device, 115 heat-source-side fan, 116 heat-source-side control unit, 200 air-conditioning apparatus

The invention claimed is:

1. An air-conditioning apparatus comprising:
   a heat-source-side unit including a compressor, a heat-source-side heat exchanger, and a throttle device;
   a use-side unit including an air duct, a use-side fan, and a use-side heat exchanger;
   a control unit configured to control rotation speed of the use-side fan; and
   a memory configured to store
      a first tabular form which specifies first relationships between a rotation speed of the use-side fan and an airflow of the use-side fan for each output of the use-side fan, and
      a second tabular form which specifies second relationships between an external static pressure in the air duct and the airflow of the use-side fan for each of the outputs of the use-side fan,
   wherein when selecting an initialization mode,
   the control unit is configured to
      operate the use-side fan with a first output,
      determine a first rotation speed of the use-side fan operated with the first output,
      calculate a first airflow of the use-side fan based on the first tabular form, the first output, and the first rotation speed,
      calculate an initial external static pressure based on the second tabular form, the first output, and the first airflow,
   the memory is configured to store the initial external static pressure,
   wherein after finishing the initialization mode,
   the control unit is configured to
      operate the use-side fan with a second output,
      determine a second rotation speed of the use-side fan operated with the second output,
      calculate a second airflow of the use-side fan based on the first tabular form, the second output, and the second rotation speed,
      calculate a current external static pressure based on the second tabular form, the second output, and the second airflow, and
      control the rotation speed of the use-side fan based on the current external static pressure and the initial external static pressure.

2. The air-conditioning apparatus of claim 1, wherein:
   the control unit controls capacity of the compressor;
   the apparatus comprises a blown-out-air temperature sensor that detects a temperature of air blown out from the use-side fan; and
   the control unit controls the capacity of the compressor so that the temperature detected by the blown-out-air temperature sensor reaches a predetermined temperature.

3. The air-conditioning apparatus of claim 2, comprising:
   a gas-liquid two-phase temperature sensor installed in the vicinity of the center of the path of the use-side heat exchanger;
   wherein the control unit
   controls the capacity of the compressor so that at least either the temperature detected by the blown-out-air temperature sensor or the temperature detected by the gas-liquid two-phase temperature sensor reaches a predetermined temperature.

4. The air-conditioning apparatus of claim 1, comprising:
   a temperature sensor that detects a temperature of an air-conditioning target area; and
   a calculating portion that calculates a necessary airflow from a set temperature set by a user and the temperature detected by the temperature sensor,
   wherein the control unit
   controls at least one of the use-side fan and the compressor in accordance with input information from the calculating portion.

5. The air-conditioning apparatus of claim 4, wherein
   the temperature sensor and the calculating portion are provided in an operating portion that receives various instructions from the user.

6. The air-conditioning apparatus of claim 1, wherein
   the control unit is equipped with a nonvolatile memory that stores the initial external static pressure calculated by the control unit.

7. An air-conditioning apparatus comprising:
   a heat-source-side unit including a compressor, a heat-source-side heat exchanger, and a throttle device;
   a use-side unit including an air duct, a use-side fan and a use-side heat exchanger; and
   a controller configured to control a rotation speed of the use-side fan and a frequency of the compressor,
   wherein when selecting an initialization mode, the controller is configured to
      operate the use-side fan with a first rotation speed, and determine an airflow of the use-side fan based on the first rotation speed,
      calculate an initial external static pressure in the air duct based on the first rotation speed and the airflow of the use-side fan,
   wherein after finishing the initialization mode, the controller is configured to
      operate the use-side fan with a second rotation speed,
      calculate a current external static pressure in the air duct based on the second rotation speed,
      when a difference between the current external static pressure and the initial external static pressure is within a predetermined range, maintain the rotation speed of the use-side fan,
      when the difference is below a lower limit of the predetermined range, operate the use-side fan with a third rotation speed which is larger than the second rotation speed, and
      when the difference is above an upper limit of the predetermined range, operate the use-side fan with a fourth rotation speed which is lower than the second rotation speed and decrease the frequency of the compressor after starting to operate the use-side fan with the fourth rotation speed.

8. The air-conditioning apparatus of claim 7, wherein
   when the difference is below the lower limit of the predetermined range, the controller is configured to operate the use-side fan with the third rotation speed and increase the frequency of the compressor after starting to operate the use-side fan with the third rotation speed.

9. An air-conditioning apparatus comprising:
   a heat-source-side unit including a compressor, a heat-source-side heat exchanger, and a throttle device;
   a use-side unit including an air duct, a damper, a use-side fan and a use-side heat exchanger; and
   a temperature sensor configured to detect a first temperature of the air-conditioning target area,
   a controller configured to control a rotation speed of the use-side fan, a frequency of the compressor and an opening-degree of the damper, wherein when selecting an initialization mode, the controller is configured to
  operate the use-side fan with a first rotation speed, and determine a first airflow of the use-side fan based on the first rotation speed,
  calculate an initial external static pressure in the air duct based on the first rotation speed and the first airflow of the use-side fan,
wherein after finishing the initialization mode, the controller is configured to
  operate the use-side fan with a second rotation speed,
  determine a second airflow of the use-side fan based on the second rotation speed,
  calculate a necessary airflow based on a first difference between the first temperature and a second temperature set by a remote controller,
  control the opening degree of the damper to be a predetermined opening-degree based on the first difference,
  calculate a current external static pressure in the air duct based on the second rotation speed,
  when a second difference between the current external static pressure and the initial external static pressure is above a first predetermined value, operate the use-side fan with a third rotation speed which is lower than the second rotation speed and maintain the opening-degree of the damper,
  when the second difference is equal to or below the predetermined value
    and when a third difference between the second airflow and the necessary airflow is above a second predetermined value, operate the use-side fan with the third rotation speed and maintain the opening-degree of the damper,
    and when the third difference is equal to or below the second predetermined value, operate the use-side fan with a fourth rotation speed which is larger than the second rotation speed or maintain the rotation speed and maintain the opening-degree.

* * * * *